Figure 3:
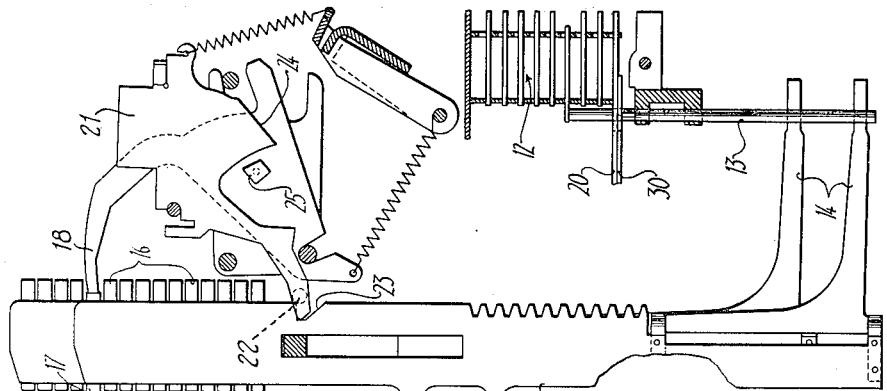

Nov. 13, 1956     O. W. SWANSON     2,770,187
CHECK WRITING ACCOUNTING MACHINE
Filed Dec. 6, 1954     2 Sheets-Sheet 1
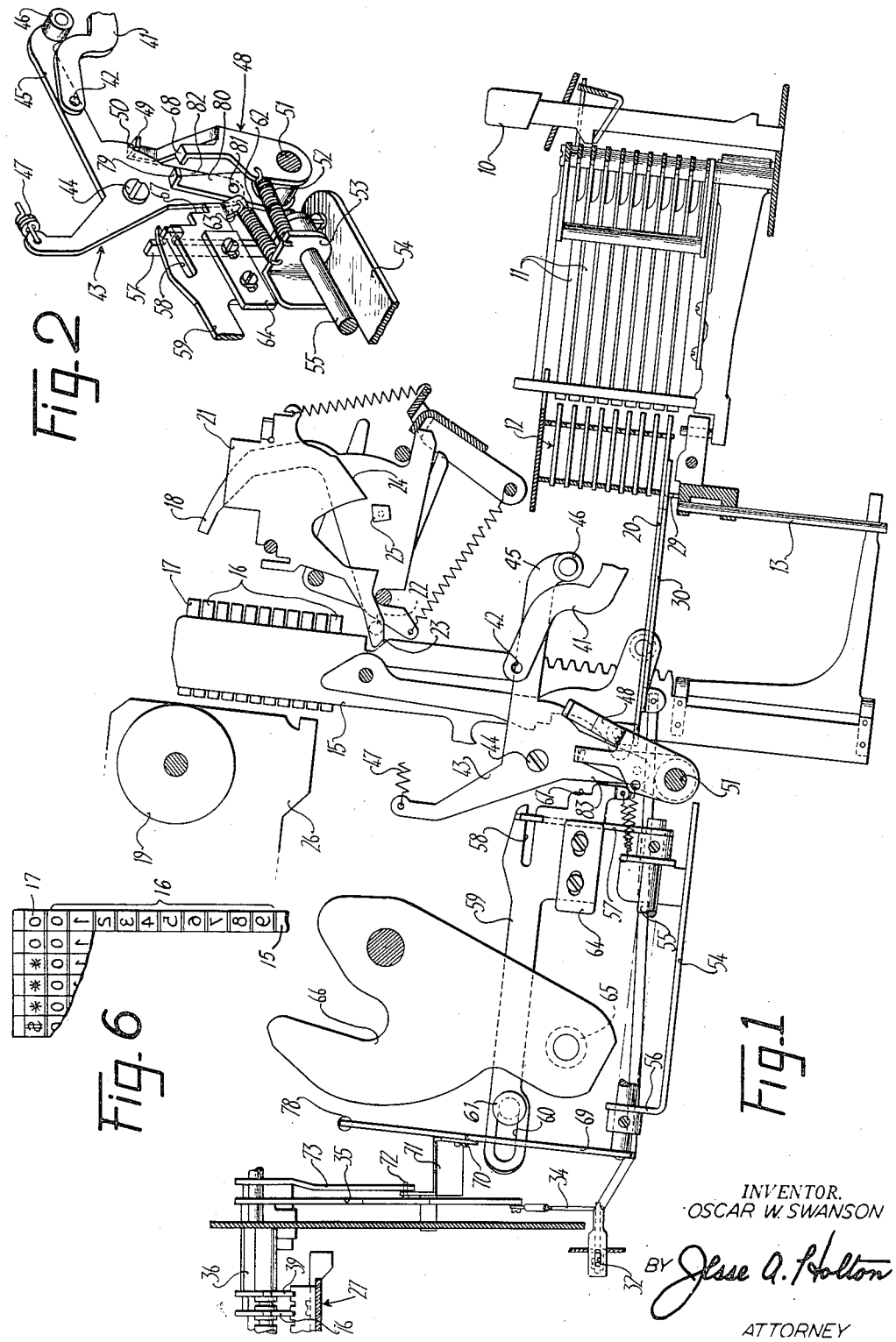
INVENTOR.
OSCAR W. SWANSON
BY Jesse A. Holton
ATTORNEY Nov. 13, 1956

O. W. SWANSON 2,770,187

CHECK WRITING ACCOUNTING MACHINE

Filed Dec. 6, 1954

2 Sheets-Sheet 2

INVENTOR.
OSCAR W. SWANSON

BY

Jesse A. Holton

ATTORNEY

United States Patent Office 2,770,187
Patented Nov. 13, 1956

2,770,187

CHECK WRITING ACCOUNTING MACHINE

Oscar W. Swanson, Bridgeport, Conn., assignor to Underwood Corporation, New York, N. Y., a corporation of Delaware Application December 6, 1954, Serial No. 473,426

3 Claims. (Cl. 101—93)

This invention relates to accounting machines, especially accounting machines of the so-called ten-key type and in its more particular aspects to a machine adapted for printing checks or money orders.

In general, the procedure for making out a money order on an accounting machine is to record the amount of the order on a tape or other record to be retained by the maker and then print that amount at two or more points on the money order blank. It is highly desirable to print protective symbols on the order blank before the highest order digit of the amount to guard against raising of the amount but it is generally not desirable to print the protective symbols on the tape. The amount of each money order should of course be entered into a register or totalizer so that the sum of a group of orders may be readily ascertained.

Heretofore it has been possible, with a ten-key accounting machine, to print protective symbols only during totaling or sub-totaling operations and in view of that fact, the amount has been printed on the order blank first as a sub-total and then as a total. This of course necessitated the use of a machine having at least two registers, one of which was cleared by the totaling operation each time a money order was made out and the other of which was used to accumulate the sum of a group of orders as shown on the tape or tally and from which the total could be printed periodically as desired.

It is broadly the object of the present invention to provide a single register ten-key accounting machine so constructed and arranged as to print protective symbols on a check or money order form without the necessity of a total taking operation and the consequent clearing of the amount from the register.

It is a further object of the invention to provide a ten-key accounting machine whereby protective symbols may be automatically printed to the left of a keyboard set amount.

These and further objects, features and advantages will become readily apparent as the description of a preferred embodiment of the invention proceeds.

Referring now to the drawings:

Figure 1 is a view partially in side elevation and partially in cross section showing the invention embodied in an accounting machine, Figure 2 is a perspective view of a portion of the mechanism for preventing the clearing of the keyboard during a cycle of the machine, Figure 3 is a view partially in side elevation and partially in cross section showing the position of certain of the parts at the time an amount is being printed.

Figure 7:
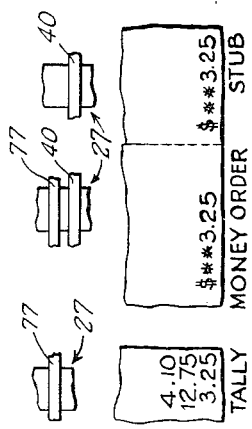
Figure 5:
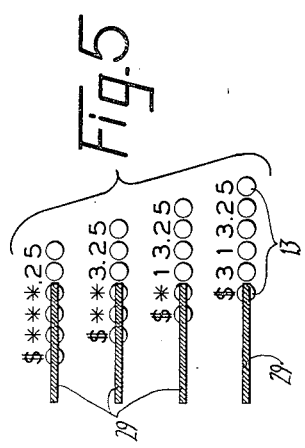
Figure 4:
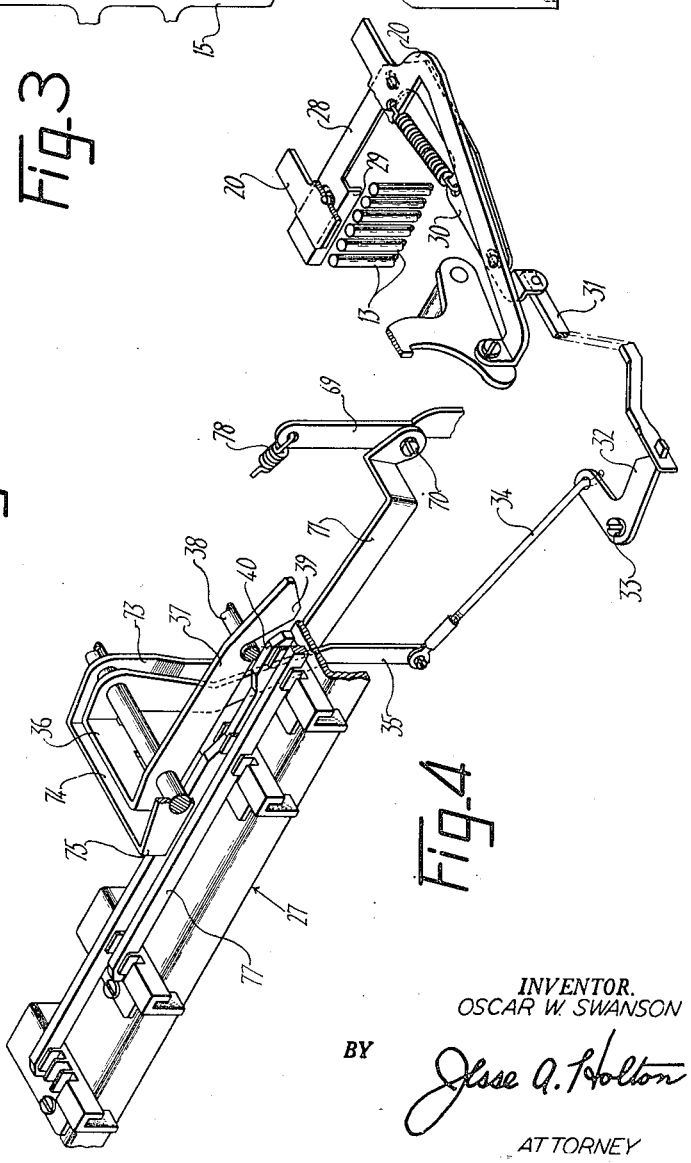

Figure 4 is a perspective view showing the automatic controls for the protective symbol printing mechanism, Figure 5 is a diagrammatic showing of the printing of protective symbols to the left of various amounts and a portion of the control mechanism therefor, Figure 6 is a front elevational view of the upper portion of the type bars, and Figure 7 is a representation of the type of work accomplished by the machine and showing diagrammatically the automatic controls effective in the various working columns.

The invention is illustrated as embodied in a "Sundstrand" accounting machine but a complete machine has not been shown because the other features thereof are well known and are not affected in any way by this invention. In general, the machine comprises a keyboard having ten numeral keys, one of which is indicated at 10, and certain control keys and a motor bar, not shown. As described in the patent to Sundstrand, No. 1,198,487, the numeral keys are effective through push links 11 to index a field of stop pins generally designated at 12 and said pins, in cooperation with tail pins 13 carried by swinging arms 14 of vertically slidable type bars 15, control the height to which said type bars are permitted to rise during a cycle of operation of the machine. The type bars 15, except the units of cents and tens of cents bars, as will be referred to later, are each provided with a full complement of digit types 16 and a symbol type 17 adapted to be impelled by hammers 18 against a platen 19. As is usual in machines of the type to which this invention appertains, the type normally located one step below the printing point is the "0," the one below that is the "1" and so on, the lowermost type being the "9." In acordance with this invention, the uppermost type, the symbol type, is normally aligned with the printing point. A front view of the upper portion of one of the type bars is shown in Figure 6. The symbol type 17 for the highest denominational order type bar may be in the form of a dollar sign while that of the lower order type bars is preferably in the form of an asterisk or star or the like.

As explained in the patent to Sundstrand No. 1,583,102, the tail pins 13 are normally located to the left of the field of stop pins 12 and are swung to the right as an amount is indexed from the keyboard, one tail pin 13 at a time moving into alignment with the field of stop pins. Those tail pins 13 for the higher denominational orders not used remain leftward of the field of stop pins and when the type bars rise during a cycle those higher order tail pins contact a zero stop plate 20, see Figure 4, which as explained in the Patent No. 1,583,102 moves rearward to cover those tail pins 13 of the unindexed orders upon the operation of the first numeral key.

As explained in the Sundstrand Patent No. 1,747,743, even though the type bars for the unused higher orders rise to a "0" position, those "0's" are not printed because the hammers 18 therefore are not permitted to operate. There is a latch plate 21 swingably mounted alongside each printing hammer 18 and when the type bars are in "0" position said latch plates swing clockwise during the cycle, a pin 22 thereon entering a notch 23 of the associated type bar, to position a shoulder 24 in the path of movement of a stud 25 of the associated hammer. The latch plates have interengaging tabs overlapping to the left so that any type bar which rises to a significant figure position, thereby moving its notch 23 out of the path of the pin 22 so that the associated latch plate cannot swing clockwise, is effective to prevent swinging of those latch plates to the right thereof and the right hand or lower order hammers are therefore effective to cause printing of significant zeros, as explained in said Patent No. 1,747,743.

The platen 19 is mounted on a carriage, partially indicated at 26, whereby forms or work sheets wrapped around said platen may be moved to different columnar positions, as will readily be understood. Mounted to travel with said carriage is a control plate generally designated at 27. The particular construction and mounting of the control plate is not a part of this invention but it may conveniently be constructed and mounted as shown in Figure 3 of the patent to Swanson, No. 2,650,759, wherein the control carriage 37 corresponds to control plate 27.

As will presently be described in detail, this invention provides means operable automatically when the carriage is in certain positions to prevent the higher order type bars, that is, those to the left of the highest order significant figure, from rising to the usual zero position during a machine cycle. To this end a member 28 having a bent over tab 29, see particularly Figure 4, is slidably mounted beneath the zero stop plate 20 and when the carriage is in certain columnar positions, the member 28 is slid from a normally inactive position to a position wherein the tab 29 closely overlies the tail pins 13. As an amount is indexed, the tail pins 13 of the indexed orders move to the right as aforesaid and get out from under the tab 29 but the tail pins of those type bars representing the unindexed orders remain beneath the tab and are thereby prevented from rising, thus maintaining those type bars with their protective symbols 17 aligned with the platen. The notches 23 of the type bars are only aligned with the latch plate pins 22 when the type bars are in zero position and, as indicated in Figure 3, when a type bar has its protective symbol aligned with the platen, the pin 22 strikes an edge of said type bar to prevent clockwise swinging of the latch plate. The hammers 18 for the type bars which have not risen at all are therefore free to operate the symbol type. The type bars for the units of cents and tens of cents do not carry a protective symbol type but instead are provided with a second "0" type so that should an amount of less than ten cents be entered, a "0" will be printed in the tens of cents position and should the machine by cycled without an amount being entered on the keyboard, two zeros will be printed after the protective symbols.

For automatically operating the member 28 the following mechanism is provided; see particularly Figure 4. To an arm 30 of the member 28 is pivotally connected one end of a link 31 the other end of which is articulated to one arm of a bell crank 32. The bell crank 32 is pivotally mounted on a stationary part of the machine by means of a screw 33 and the other arm thereof is connected to one end of a link 34. The other end of link 34 is pivotally connected to an arm 35 of a pivotally mounted bail member 36. Another arm 37 of the bail member normally rests upon a stationary support 38 and is provided with a cam portion 39 adapted to be engaged by a cam 40 carried by the control plate 27 when the carriage is in certain columnar positions. When the cam 40 engages the cam portion 39 of the arm 37, the bail member 36 is rocked and through the linkage above described is effective to move the tab 29 over the tops of the tail pins 13.

Since as previously mentioned, the machine of the present invention is primarily designed for making out money orders, there will be a cam 40 for each position that the amount is to appear on the money order. However, it is also desirable to print the amount on a tally or other record to be retained and since the tally will have listed in a vertical column a large group of amounts, the presence of so many protective symbols would be confusing and therefore there will be no cam 40 for that column and the amounts will be printed in the usual manner with the insignificant orders being suppressed, as described in the Sundstrand Patent No. 1,747,743, referred to above.

In making out a money order, the operator will first enter the amount on the keyboard and then operate the motor bar. At that time the carriage is in position for printing the amount on the tally and the amount will be printed without protective symbols and simultaneously added into the register in a well known manner. Ordinarily, the amount would be automatically cleared from the field of index pins 12 at the end of the printing cycle but in the machine of the present invention such clearing is prevented by means presently to be described. The carriage is then tabulated to position for printing the amount on the money order form and in this position the amount will be preceded by the protective symbols as aforesaid and the machine will be automatically conditioned for "non-add" by suitable means not necessary to describe herein. If desired, the amount may be printed a second or a third time on the form in the same manner. Thus the present invention makes it possible to print protective symbols before the amount on the money order form without the necessity of a sub-total or total operation and consequently the single register need not be cleared for each money order but may be employed for accumulating the total of a large number of orders. Since there is no control cam 40 for the column employed for printing the tally, the member 28 is ineffective in that column and a total may be taken in the usual manner whenever desired.

The means for normally clearing the amount from the field of stop pins 12 upon each cycle to condition the machine for another entry is so well known that it is not necessary to describe same in detail here. However, in general, such means comprises a device which wipes leftward across the field of stop pins to restore any indexed pins to normal position and said device also moves the tail pins 13 and the push links 11 back to their home positions. Such device is operated as described in the above referred to patents to Sundstrand, Nos. 1,198,487 and 1,583,102 and in the present drawings the bar 74 of said patents is partially shown in Figure 1 at 41. The bar 41 is pivotally connected at 42 to a member not shown and said member moves said bar during a cycle first to the left, as viewed in Figure 1, and then back to the position shown. The right hand end of the bar 41 is free to move upward a short distance and is so moved by a spring during the leftward movement of said bar and then during the return movement of the bar its right hand end operates the amount clearing means. As explained in said Sundstrand patents, if the bar 41 is rocked down about its pivotal connection 42 the amount clearing means will not be operated and the amount may again be added or non-added without resetting same into the keyboard.

The present invention provides the following means for rocking the bar 41 to prevent the amount from being cleared. A member 43 is pivotally mounted upon a stationary part of the machine at 44 and has an arm 45 carrying a roller 46 which overlies the upper edge of the bar 41. The member 43 is urged clockwise by a spring 47 but is normally prevented from moving by means of a latch member 48 which has an ear 49 engaging a step 50 provided on the member 43. The latch member 48 is pivotally mounted upon a stationary stub shaft 51 and normally held in latching engagement with the stop 50 by means of a spring 52 extending between said latch member and an ear 53 of a bracket 54. Swinging of the latch member 48 in a clockwise direction in a manner presently to be explained removes the ear 49 thereof from engagement with the step 50 and permits the spring 47 to rock the member 43 clockwise, whereupon the roller 46 moves the bar 41 downward about its pivot 42.

As shown in Figures 1 and 2, a shaft 55 is rockably mounted in the ear 53 of the bracket 54 and another ear 56 provided on said bracket. An upstanding arm 57 is secured to one end of the shaft 55 and its upper end is provided with notches for interfitting with an elongated open ended slot 58 provided in one end of a slide 59. The opposite end of the slide 59 is provided with an elongated opening 60 for loosely guiding said slide on a headed stud 61. The slide is normally held in the position shown by means of a spring 62 extending between the ear 53 of the bracket 54 and a tab 63 provided on said slide. A kick plate 64 is adjustably secured to the slide 59 and during each cycle of the machine a roller 65 on the main cycle cam 66 strikes said kick plate to move the slide toward the right as viewed in Figure 1. As is known, the main cam 66 swings first counterclockwise and then back during each cycle. The right hand end of the slide 59 is provided with a step 67 and the latch member 48 is provided with a tab 68 and normally the step 67 passes by the tab 68 without striking it but provision is herein made, as will presently be explained, for moving the slide sideways so that during a cycle the step 67 will contact the tab 68 and release the latch member from engagement with the member 43.

Referring now to Figures 1 and 4, a lever 69 is secured at its lower end to the shaft 55 and is pivotally connected intermediate its ends at 70 to one end of a link 71 the other end of which is pivotally connected at 72 to an arm 73 of a pivotally mounted bail member 74. The bail member 74 has another arm 75 carrying a cam 76 similar to the cam 39 for cooperating with a control member 77 of the control plate 27. A spring 78 extending between the upper end of the lever 69 and a stationary part of the machine is normally effective to hold the shaft 55 rocked to a position wherein the slide 59 is against a suitable stop, not shown, and so that said slide will not strike the tab 68 of the latch member 48. However, when the cam 76 is engaged by the control member 77, the above described linkage rocks the shaft 55 and the arm 57 moves the slide to a position where the shoulder 67 thereof will contact the tab 68 of the latch member 48 during the sliding movement of said slide to thereby permit the member 43 to operate the bar 41 so that the amount printed during that cycle will remain set up in the field of stop pins 12.

Because of the nature of the work to be performed by the machine of this invention, the control member 77 is extended the full width of the control plate 27 except for the last or right hand columnar position. Thus the amount of a money order is entered on the keyboard only once and is retained until the amount is printed for the last time.

In the column for printing the amount for the last time, which may be on the money order stub, the slide 59 is permitted to return to its normal position under the action of the spring 78 and during its rightward travel in that printing cycle, the step 67 thereof strikes a tab 79 of a restoring arm 80. The arm 80 is pivotally mounted upon the shaft 51 and is pivotally connected at 81 to an arm 82 of the member 43. When the step 67 strikes the tab 79, the restoring arm 80 is rocked clockwise and through its pivotal connection with the arm 82 said restoring arm rocks the member 43 counterclockwise to raise the roller 46 thereof from engagement with the bar 41. Upon restoration of the member 43 to the position shown in the drawing, the spring 52 snaps the tab 49 of the latch member 48 beneath the step 50 to thereby retain member 43 in ineffective position and permit the set up amount to be cleared from the field of stop pins 12 during that same cycle. The machine is thus conditioned for making out the next order.

To further clarify the operation of the machine of the present invention, reference is now made to Figure 7. As the first step in the operation, the operator sets up the amount of a money order on the keyboard and depresses the usual motor bar. At the time of setting up the amount, the carriage is so positioned that the tally strip, upon which a record of all transactions is retained, is positioned in alignment with the type bars 15 and the cam 77 of the control plate 27 is in engagement with the arm 75 so as to operate the item retaining mechanism as above described. The cam 40 is not effective in this position of the carriage so that as the amount is printed during the cycle initiated by depression of the motor bar, the tab 29 of member 28 does not interfere with the movement of the type bars of the unindexed orders and therefore the unindexed order type bars rise to their "0" positions and no protective symbols are printed upon the tally strip. After the printing of the amount, the carriage moves to its next columnar position in the usual well-known manner and in the present case this next columnar position brings the money order into alignment with the type bars. In this column, the cams 77 and 40 are both effective, as indicated in Figure 7 and therefore upon depression of the motor bar the type bars of the unindexed orders are held down with their protective symbols aligned with the platen. The amount is therefore printed as indicated, with protective symbols preceding the amount and said amount is again retained in the field of stop pins 12. After the amount is printed on the money order, the carriage tabulates automatically to the position for aligning the stub of the money order with the type bars. In this position of the carriage the cam 40 is effective to cause the printing of protective symbols but since there is no cam 77 in this columnar position, the amount will be cleared from the stop pins as previously mentioned to thereby condition the machine for the setting up of the amount of the next money order.

Having thus described a preferred embodiment of the invention, what is claimed is:

1. In a ten-key accounting machine having a platen carried by a carriage tabulatable to different columnar positions, a plurality of denominational order representing type bars, each type bar having a protective symbol type and a full complement of digit types, said type bars being normally positioned with their protective symbol types aligned with the platen and being differentially operable to align the digit types thereof with the platen, a field of indexable stops for controlling the differential operation of said type bars, a ten-key keyboard for indexing amounts in said field of stops, cycling mechanism for operating said type bars, said cycling mechanism normally moving the type bars representing the uniindexed denominational orders to their "0" positions, means operable in a first columnar position of the carriage to print an amount set up in said field of stops, means operable in said first columnar position to suppress the printing of insignificant "0's", means for retaining the amount set up in said field of stops, means operable in a second columnar position of said carriage for printing the amount set up in said field of stops, means operable in said second columnar position for retaining the type bars representing the unindexed orders in their normal positions with their protective symbol types aligned with the platen, and means operable in said second columnar position for printing protective symbols to the left of the amount.

2. In a machine of the class described having a platen carried by a carriage tabulatable to different columnar positions, a control plate connected to said carriage for controlling the function of the machine in different columnar positions, a plurality of denominational order representing type bars, said type bars each carrying a full complement of digit types and a protective symbol type and moving during a machine cycle from positions wherein said portective symbol types are aligned with the platen to amount representing positions under control of stops indexable from a ten-key keyboard, the type bars representing the unindexed insignificant orders normally rising to "0" position, means for printing the amount and means for suppressing the printing of insignificant zeros, means operable by the control plate in predetermined columnar positions to prevent the moving of the type bars representing the unindexed insignificant orders and means operable in those columnar positions to print protective symbols in the insignificant order positions.

3. In a machine of the class described having a platen carried by a carriage tabulatable to different columnar positions, a control plate connected to said carriage for controlling the function of the machine in different columnar positions, a plurality of denominational order representing type bars, said type bars each carrying a full complement of digit types and a protective symbol type, said type bars rising during a printing cycle from positions wherein said protective symbol types are aligned with the platen to amount representing positions under control of stops indexable from a ten-key keyboard, the type bars representing the unindexed insignificant orders normally rising to "0" position during the printing cycle, a printing hammer for each type bar for impelling the types aligned with the platent against the platen, means for preventing the operation of those hammers whose type bars rise to insignificant "0" position, a device normally ineffective but operable by the control plate in predetermined columnar positions of the carriage to prevent the rising of the type bars representing unindexed insignificant orders, and said printing hammers being operable in said predetermined columnar positions to impel against the platen the protective symbol types of those type bars which have not risen.

References Cited in the file of this patent

UNITED STATES PATENTS

| | | |
|---|---|---|
| 1,198,487 | Sundstrand | Sept. 19, 1916 |
| 1,747,743 | Sundstrand | Feb. 18, 1930 |
| 2,340,372 | Fettig | Feb. 1, 1944 |
| 2,650,759 | Swanson | Sept. 1, 1953 |
| 2,668,659 | Swanson | Feb. 9, 1954 |